United States Patent
Fujii et al.

(10) Patent No.: US 10,200,564 B2
(45) Date of Patent: Feb. 5, 2019

(54) IMAGE READING DEVICE, METHOD AND NON-TRANSITORY COMPUTER-READABLE MEDIUM FOR DETECTING MOVING IMAGE READER POSITIONS TO CORRECT SKEW

(71) Applicants: Yuki Fujii, Kanagawa (JP); Yasunobu Youda, Kanagawa (JP); Yohei Osanai, Kanagawa (JP); Tatsuaki Nagano, Kanagawa (JP); Satoshi Narai, Kanagawa (JP); Toshiyuki Horikawa, Kanagawa (JP); Takuji Kawai, Kanagawa (JP); Daisuke Imaki, Tokyo (JP); Takayuki Andoh, Kanagawa (JP); Susumu Miyazaki, Tokyo (JP); Tetsuo Inui, Kanagawa (JP); Koichi Ono, Kanagawa (JP); Takeshi Shikama, Kanagawa (JP); Shingo Shiramura, Kanagawa (JP); Hideo Tanaka, Kanagawa (JP)

(72) Inventors: Yuki Fujii, Kanagawa (JP); Yasunobu Youda, Kanagawa (JP); Yohei Osanai, Kanagawa (JP); Tatsuaki Nagano, Kanagawa (JP); Satoshi Narai, Kanagawa (JP); Toshiyuki Horikawa, Kanagawa (JP); Takuji Kawai, Kanagawa (JP); Daisuke Imaki, Tokyo (JP); Takayuki Andoh, Kanagawa (JP); Susumu Miyazaki, Tokyo (JP); Tetsuo Inui, Kanagawa (JP); Koichi Ono, Kanagawa (JP); Takeshi Shikama, Kanagawa (JP); Shingo Shiramura, Kanagawa (JP); Hideo Tanaka, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 2 days.

(21) Appl. No.: 15/397,768

(22) Filed: Jan. 4, 2017

(65) Prior Publication Data
US 2017/0208208 A1 Jul. 20, 2017

(30) Foreign Application Priority Data

Jan. 19, 2016 (JP) .................................. 2016-007885
Nov. 17, 2016 (JP) .................................. 2016-224468

(51) Int. Cl.
H04N 1/387 (2006.01)
H04N 1/04 (2006.01)
H04N 1/047 (2006.01)

(52) U.S. Cl.
CPC ............. H04N 1/3878 (2013.01); H04N 1/04 (2013.01); H04N 1/0473 (2013.01); H04N 2201/0081 (2013.01)

(58) Field of Classification Search
None
See application file for complete search history.

(56) References Cited

U.S. PATENT DOCUMENTS 6,583,895 B1* 6/2003 Kuwahara ............... H04N 1/107
358/444
2010/0302607 A1* 12/2010 Hock .................... H04N 1/0473
358/474

(Continued)

FOREIGN PATENT DOCUMENTS

JP 05-328050 12/1993

Primary Examiner — Benny Q Tieu
Assistant Examiner — Haris Sabah
(74) Attorney, Agent, or Firm — Harness, Dickey & Pierce, P.L.C.

(57) ABSTRACT

An image reading device includes: a reading unit; a first detecting unit that detects a position of the reading unit in the sub-scanning direction; a second detecting unit that detects (Continued)

a position of the reading unit in the sub-scanning direction; and a calculating unit that calculates a skew quantity and a skew direction of the reading unit, based on a difference, introduced by the skew, between a travel distance by which the reading unit has travelled from a measurement reference position located on an upstream side of the first detecting unit and the second detecting unit in a moving direction to a point where the reading unit is detected by the first detecting unit, and a travel distance by which the reading unit has travelled from the measurement reference position to a point where the reading unit is detected by the second detecting unit.

12 Claims, 9 Drawing Sheets

(56) References Cited

U.S. PATENT DOCUMENTS

2015/0015917 A1* 1/2015 Hirohata ............ H04N 1/00432
   358/3.24
2015/0264207 A1* 9/2015 Kitaichi ............. H04N 1/00798
   358/434

* cited by examiner

IMAGE READING DEVICE, METHOD AND NON-TRANSITORY COMPUTER-READABLE MEDIUM FOR DETECTING MOVING IMAGE READER POSITIONS TO CORRECT SKEW

CROSS-REFERENCE TO RELATED APPLICATIONS

The present application claims priority under 35 U.S.C. § 119 to Japanese Patent Application No. 2016-007885, filed Jan. 19, 2016 and Japanese Patent Application No. 2016-224468, filed Nov. 17, 2016. The contents of which are incorporated herein by reference in their entirety.

BACKGROUND OF THE INVENTION

1. Field of the Invention

The present invention relates to an image reading device, an image reading method, and a non-transitory computer-readable medium.

2. Description of the Related Art

In an image reading device including a reading unit that reciprocates in the sub-scanning direction to optically read an image of an original, the reading unit extending in the main scanning direction sometime becomes skewed (titled) with respect to the main scanning direction. A technology for detecting the quantity of a skew using a sensor has already been known.

Japanese Unexamined Patent Application Publication No. H5-328050 discloses an image reading device including a filler (flag) provided to the reading unit and enabling the position of the reading unit to be detected, and a sensor for detecting the filler. According to the disclosure of Japanese Unexamined Patent Application Publication No. H5-328050, the skew quantity (inclination angle) of the reading unit is detected based on the amount of change in the filler length detected by the sensor as the filler travels across the sensor.

In Japanese Unexamined Patent Application Publication No. H5-328050, in order to improve the skew quantity detection accuracy, the length of the filler needs to be extended, and therefore, the size of the device becomes increased, disadvantageously. Furthermore, in Japanese Unexamined Patent Application Publication No. H5-328050, the sensor lacks the capability of detecting the direction in which the reading unit is skewed, that is, whether the reading unit is tilted in a positive direction or a negative direction.

SUMMARY OF THE INVENTION

According to an aspect of the present invention, there is provided an image reading device including: a reading unit configured to include a scanning section extending in a main scanning direction, and configured to optically read an image of an original; a driving unit configured to move the reading unit in a sub-scanning direction; a first detecting unit configured to detect a position of the reading unit in the sub-scanning direction; a second detecting unit configured to be disposed at a position different from that of the first detecting unit in the main scanning direction, and configured to detect a position of the reading unit in the sub-scanning direction; and a calculating unit configured to calculate a skew quantity and a skew direction of the reading unit, based on a difference, introduced by the skew, between a travel distance by which the reading unit has travelled from a measurement reference position located on an upstream side of the first detecting unit and the second detecting unit in a moving direction to a point where the reading unit is detected by the first detecting unit, and a travel distance by which the reading unit has travelled from the measurement reference position to a point where the reading unit is detected by the second detecting unit.

According to another aspect of the present invention, there is provided an image reading method performed by an image reading device, the image reading device including: a reading unit configured to include a scanning section extending in a main scanning direction, and configured to optically read an image of an original; a driving unit configured to move the reading unit in a sub-scanning direction; a first detecting unit configured to detect a position of the reading unit in the sub-scanning direction; and a second detecting unit configured to be disposed at a position different from that of the first detecting unit in the main scanning direction, and configured to detect a position of the reading unit in the sub-scanning direction, the image reading method including calculating a skew quantity and a skew direction of the reading unit based on a difference, introduced by the skew, between a travel distance by which the reading unit has travelled from a measurement reference position located on an upstream side of the first detecting unit and the second detecting unit in a moving direction to a point where the reading unit is detected by the first detecting unit, and a travel distance by which the reading unit has travelled from the measurement reference position to a point where the reading unit is detected by the second detecting unit.

According to still another aspect of the present invention, there is provided a non-transitory computer-readable medium comprising computer readable program codes, performed by a processor configured to control an image reading device, the image reading device including: a reading unit configured to include a scanning section extending in a main scanning direction, and configured to optically read an image of an original; a driving unit configured to move the reading unit in a sub-scanning direction; a first detecting unit configured to detect a position of the reading unit in the sub-scanning direction; and a second detecting unit configured to be disposed at a position different from that of the first detecting unit in the main scanning direction, and configured to detect a position of the reading unit in the sub-scanning direction, the program codes when executed causing the processor to execute: calculating a skew quantity and a skew direction of the reading unit based on a difference, introduced by the skew, between a travel distance by which the reading unit has travelled from a measurement reference position located on an upstream side of the first detecting unit and the second detecting unit in a moving direction to a point where the reading unit is detected by the first detecting unit, and a travel distance by which the reading unit has travelled from the measurement reference position to a point where the reading unit is detected by the second detecting unit.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
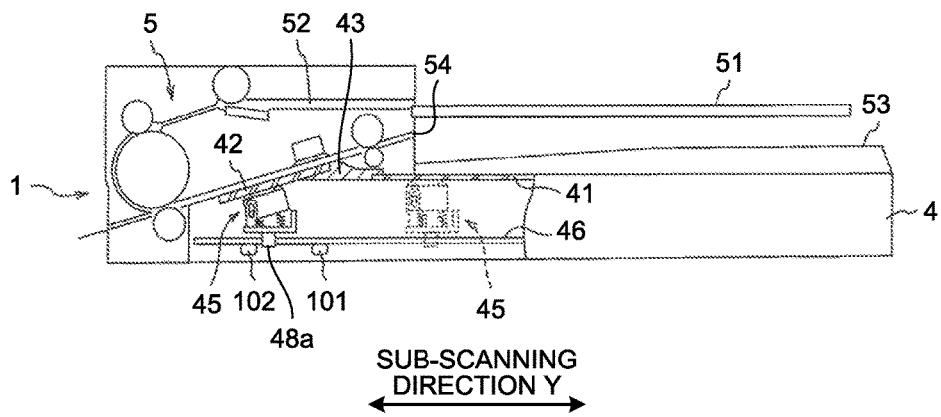
FIG. 1 is a schematic of a general configuration of an image reading device according to an embodiment, with a part thereof cut out.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

The present invention has an object to provide an image reading device, an image reading method, and a non-transitory computer-readable medium capable of detecting the skew quantity more accurately, and of detecting the direction of the skew, without increasing the size of the device.

An image reading device according to an embodiment of the present invention is characterized in that two sensors that are disposed interspaced with respect to each other in the main scanning direction are each configured to detect a reading unit, and to acquire the quantity and the direction of skew based on delays, introduced by the skew, in timing at which the respective sensors detect the reading unit. In the embodiment, in particular, because the two sensors are disposed interspaced with respect to each other in the main scanning direction, the skew can be detected more prominently in the main scanning direction. Therefore, in the embodiment, the skew quantity can be detected more accurately. Furthermore, in the embodiment, because the two sensors are disposed interspaced with respect to each other in the main scanning direction, the sensors can also detect the skew direction.

Characteristics of the image reading device according to the embodiment will now be explained in detail, with reference the following drawings. Elements, types, combinations, shapes, and their relative positioning disclosed in the embodiment are not intended to limit the scope of the present invention in any way, and these are provided as way of example only, except where specified otherwise.

General Configuration of Image Reading Device

Figure 2:
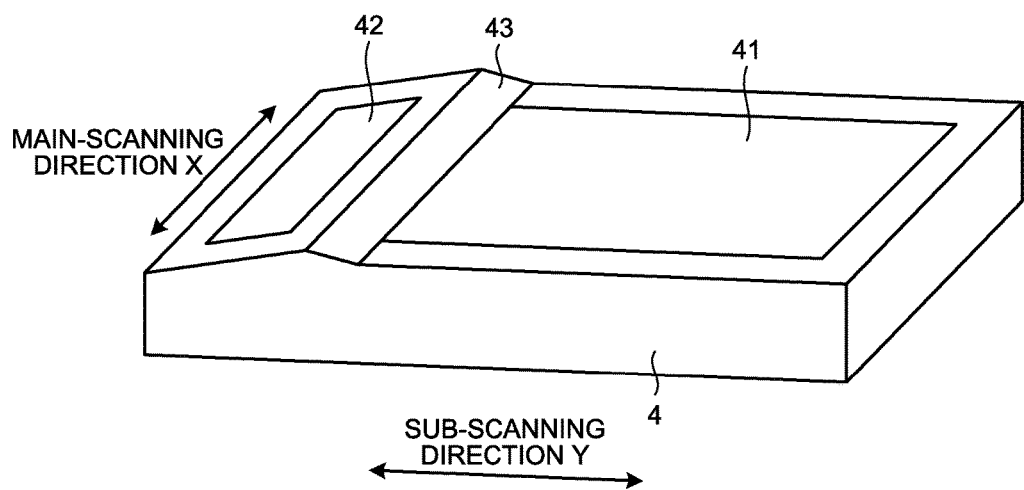
FIG. 2 is an external perspective view illustrating an image reading unit included in the image reading device.

A configuration of an image reading device according to the embodiment will now be explained. FIG. 1 is a schematic of a general configuration of an image reading device 1 according to the embodiment, with a part thereof cut out, and FIG. 2 is an external perspective view illustrating an image reading unit 4 included in the image reading device 1.

The image reading device 1 includes the image reading unit 4 for reading an image of an original, and an automatic document feeder (ADF) 5 that is disposed above the image reading unit 4, and that automatically feeds a sheet-like original (original sheet) into the image reading unit 4.

The image reading unit 4 includes a flatbed contact glass 41 on which the original is placed, a document feeder (DF) contact glass 42 whose top surface faces the original sheet fed by the ADF 5, and an inclined guide 43 interposed between the flatbed contact glass 41 and the DF contact glass 42 and connecting these glasses. The inclined guide 43 is inclined in such a manner that the end on the side of the flatbed contact glass 41 is positioned lower than the end on the side of the DF contact glass 42.

When the image reading device 1 functions as a flatbed scanner with an original to be scanned (hereinafter, also referred to as a first original) placed, the flatbed contact glass 41 included in the image reading unit 4 comes to face the image plane of the original to be scanned.

When the image reading device 1 functions as a DF scanner, the DF contact glass 42 faces the image plane of an original sheet (hereinafter, also referred to as a second original) passed across a predetermined reading position of an original conveying path 52. The top surface of the DF contact glass 42 is inclined in such a manner that a preset inclination angle $\theta$ (see FIG. 5) is formed with the horizontal top surface of the flatbed contact glass 41.

As illustrated in FIG. 1, the DF contact glass 42 is installed in such a manner that an end thereof on the side of the flatbed contact glass 41 (the right side in the drawing) is positioned higher than the other end (the left side in the drawing) in the sub-scanning direction Y.

The image reading unit 4 includes a reading unit 45, and a guide rod 46 extending in the sub-scanning direction Y. The reading unit 45 is positioned to face the original, with the flatbed contact glass 41 or the DF contact glass 42 positioned between the reading unit 45 and the original. The reading unit 45 optically scans and reads the image plane of the original, through the flatbed contact glass 41 or the DF contact glass 42.

The longitudinal direction of the reading unit 45 extends in the main scanning direction X (see FIG. 2). The reading unit 45 is configured to reciprocate in the sub-scanning direction Y along the guide rod 46 extending in the sub-scanning direction Y and internally provided in the image reading unit 4.

The image reading unit 4 includes a home position (HP) sensor 101 and a DF position (DFP) sensor 102 that are disposed interspaced with respect to each other in the main scanning direction X and the sub-scanning direction Y, as sensors for detecting the position of the reading unit 45 in the sub-scanning direction Y. The HP sensor 101 and the DFP sensor 102 may be optical sensors or micro-switches, as long as such sensors are capable of detecting the filler (flag) for position detection.

The signal output from the HP sensor 101 is used in a flatbed scanner mode, which is to be described later, in moving the reading unit 45 to a movement start position (home position). The signal output from the DFP sensor 102 is used in the DF scanner mode, which is to be described later, in moving the reading unit 45 from the movement start position to a position below the DF contact glass 42.

The ADF 5 is mounted on the rear side of (a part of the rear surface of) the image reading unit 4, on the side of the top surface of the image reading unit 4, via an opening-and-closing mechanism, such as a hinge. The ADF 5 is also enabled to be opened to an open position at which the flatbed contact glass 41 is exposed from the image reading unit 4, and to be closed to a closed position at which the image reading unit 4 is enabled to press down the original on the flatbed contact glass 41.

The ADF 5 also includes an original table 51 serving as an original setting table on which a bundle of standard-sized original sheets can be placed, the original conveying path 52 for separating each original sheet placed on the original table at a time and feeding the original sheet onto a surface facing the DF contact glass 42, and a paper ejection tray 53 on which the original sheets completed with image reading are stacked. The original table 51 and the paper ejection tray 53 are disposed on top of each other, with a space ensured, at least partially, between these original table 51 and the paper ejection tray 53, so that the size can be reduced. The original sheets carried through the original conveying path 52 are ejected from an ejecting port 54, and are stacked on the paper ejection tray 53. The image plane of the original sheet carried through the original conveying path 52 is scanned by the reading unit 45 at the given reading position, as the original sheet is passed across the DF contact glass 42.

Figure 3:
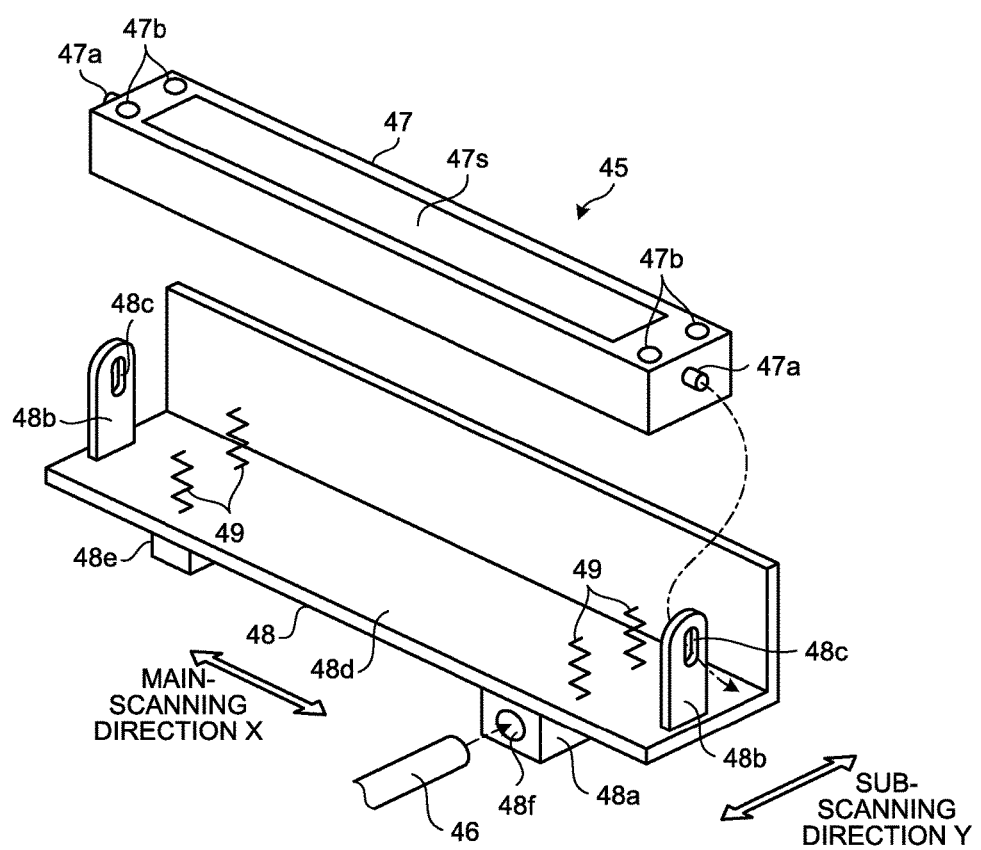
FIG. 3 is an exploded perspective view of the reading unit.

A structure of the reading unit 45 will now be explained in detail. FIG. 3 is an exploded perspective view of the reading unit 45.

As illustrated in FIG. 3, the reading unit 45 includes an optical scanning unit 47, a bracket 48 for holding the optical scanning unit 47, and a plurality of compressed coil springs 49 (elastic members) that are compressed and assembled between the optical scanning unit 47 and the bracket 48.

The optical scanning unit 47 is provided as a contact image sensor in which an equal-magnification imaging element roof mirror lens array, an optical path separating mirror, an equal-magnification image sensor, an illumination light source, and the like are assembled in a molded frame, for example. A scanning section 47s extending in the main scanning direction X is provided on the top surface of the optical scanning unit 47. The optical scanning unit 47 can scan the image in the scanning section 47s along each scan line in the main scanning direction X at high resolution, and is configured to have an extended depth of focus so that reading of an image such as that of a book original can be handled. The optical scanning unit 47 is not limited to any specific type as long as the optical scanning unit 47 can support both of the DF scanner mode and the flatbed scanner mode, which are to be described later. The main scanning direction X is a direction that is in parallel with both of the top surface of the flatbed contact glass 41 and the top surface of the DF contact glass 42.

The bracket 48 has a bottom slider 48a that is supported slidably by the guide rod 46, a pair of holding arms 48b supporting the optical scanning unit 47 at the respective both ends in the main scanning direction X, a bracket body 48d integrated with the bottom slider 48a and the pair of holding arms 48b, and an engaging unit 48e. The bottom slider 48a has a hollow 48f in a through-hole shape.

The bottom slider 48a is a tube-like body fixed to the bottom of the bracket body 48d at the center in the longitudinal direction (at the center in the main scanning direction X), and the guide rod 46 is inserted into the hollow 48f provided inside the bottom slider 48a.

The pair of holding arms 48b are provided as a pair of plate-like bodies protruding upwardly, in FIG. 3, from the respective ends of the bracket body 48d in the longitudinal direction. Each of the holding arms 48b has a long hole (elongated hole) 48c passing through the holding arm 48b and extending in the vertical direction in FIG. 3. On the end surfaces of the optical scanning unit 47 facing the respective holding arms 48b, being ends in the longitudinal direction, both-end protrusions 47a protruding perpendicularly to the respective end surfaces of the optical scanning unit 47 (along the longitudinal direction) are provided. Each of the both-end protrusions 47a has a cylindrical rod-like shape, and inserted into the corresponding long hole 48c.

The engaging unit 48e is engaged onto a timing belt 105 to be described later (see FIG. 4), and is moved as the timing belt 105 is moved. Through this engagement, the entire bracket 48 is enabled to move in the sub-scanning direction Y.

The compressed coil springs 49 press up the bottom surface of the optical scanning unit 47 (against the flatbed contact glass 41 or the DF contact glass 42), at a plurality of points in the main scanning direction X.

Mounted on the top side of the optical scanning unit 47 are top sliders 47b sliding smoothly in the sub-scanning direction Y, while abutting against the bottom surface of at least one of the flatbed contact glass 41 and the DF contact glass 42. The top sliders 47b are disposed at positions avoiding the scanning section 47s. The illustrated top sliders 47b are provided as four semi-spheric protrusions disposed at the respective corners of a substantially rectangular top surface of the optical scanning unit 47. The top sliders 47b may be provided in a ring-like shape along the outer circumference of the top surface of the optical scanning unit 47, or may be liner protrusions extending in the short-hand direction (or the longitudinal direction), and disposed at the respective ends of the longitudinal direction (or the short-hand direction). The top sliders 47b are merely an example, and the shape and the number can be designed in any way. In any configuration, however, the top sliders 47b are preferably made of a material that is highly slidable and slippery on, and has a low friction coefficient against the bottom surface of the flatbed contact glass 41 and the DF contact glass 42, or any guide surface, in replacement of these contact glasses, with no lubrication.

The optical scanning unit 47 is movably guided, in the sub-scanning direction Y, by the guide rod 46 that is provided on the bottom of the bracket 48, and is slidably inserted into the hollow 48f of the bottom slider 48a. Depending on the position of the optical scanning unit 47 in the sub-scanning direction Y, the top surface of the optical scanning unit 47 abuts against any one or both of the flatbed contact glass 41 and the DF contact glass 42 slidably. This abutment restricts tilting of the reading unit 45 about the axis of the guide rod 46, while the reading unit 45 is allowed to move along the guide rod 46.

Figure 4:
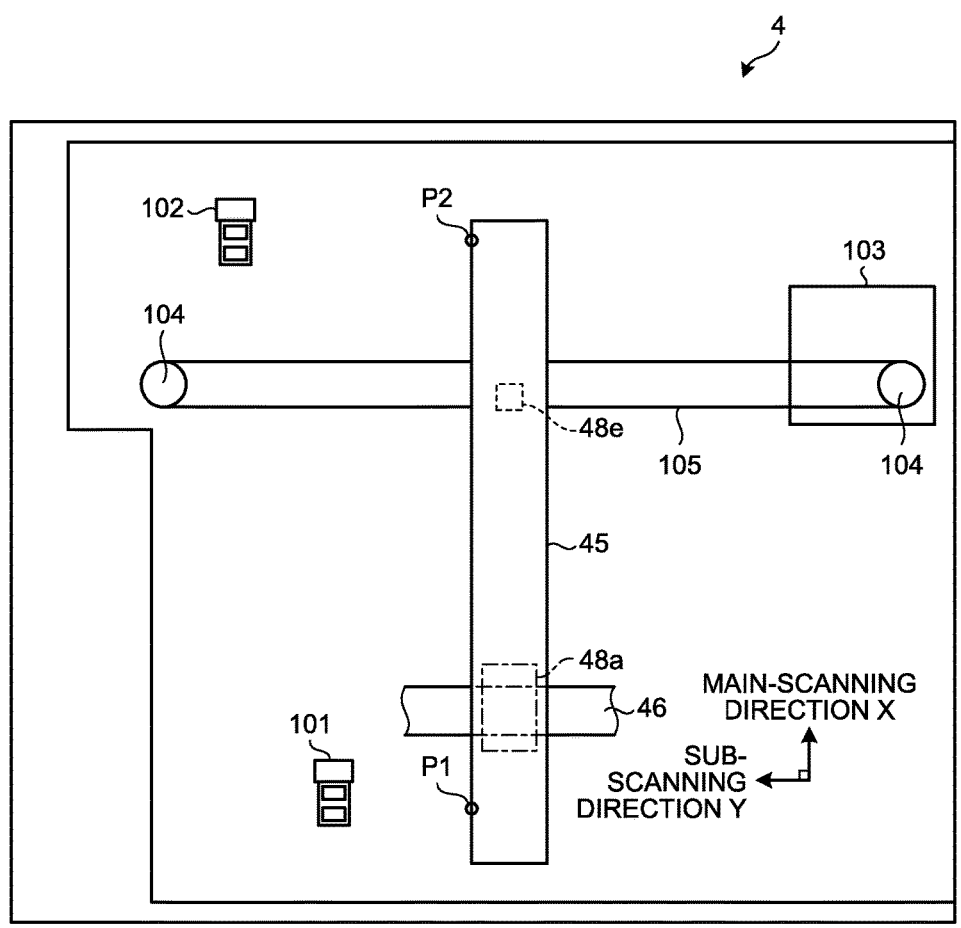
FIG. 4 is a schematic illustrating a driving system for the reading unit.

A driving system for moving the reading unit 45 to a given position in the sub-scanning direction Y will now be explained. FIG. 4 is a schematic illustrating a driving system for the reading unit 45. FIG. 4 illustrates only a part of the reading unit 45 to enable a positional relation between the guide rod 46 and the reading unit to be clearly understood, but the guide rod 46 extends across the entire sub-scanning direction Y.

As illustrated in FIG. 4, provided internally to the image reading unit 4 are two timing pulleys 104 that are disposed interspaced with respect to each other in the sub-scanning direction Y, and an endless (loop-shaped) timing belt 105 extending in the sub-scanning direction Y and stretched across the two timing pulleys 104. The image reading unit 4 also includes a stepping motor 103 for driving one of the timing pulleys 104 in rotation forward or backward. The engaging unit 48e provided to the bracket 48 of the reading unit 45 is fixed to the timing belt 105 at an appropriate position along the circumferential direction, so that the reading unit 45 is reciprocated in the sub-scanning direction Y as the timing belt 105 runs.

The HP sensor 101 and the DFP sensor 102 for detecting the reading unit 45 are disposed along the moving path of the reading unit 45. The HP sensor 101 and the DFP sensor 102 are interspaced with respect to each other in the main scanning direction X so that the HP sensor 101 detects one end of the reading unit 45 in the main scanning direction X (the position corresponding to the position P1 in the main scanning direction X), and the DFP sensor 102 detects the other end of the reading unit 45 in the main scanning direction X (the position corresponding to the position P2 in the main scanning direction X).

Operation of Reading Unit

Figure 5A:
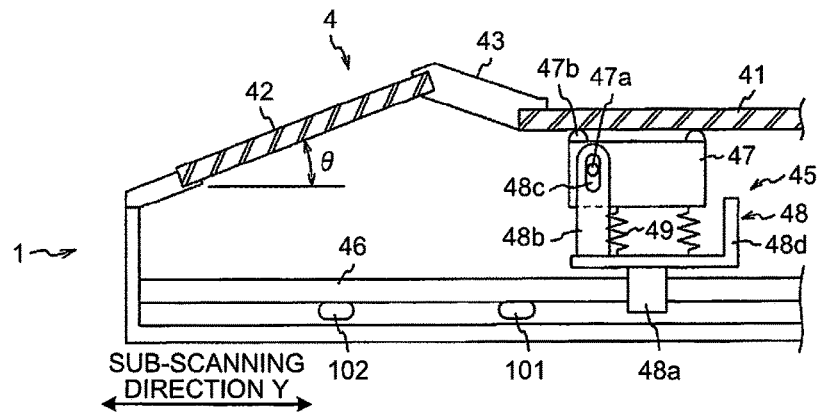
FIG. 5A is a sectional view illustrating a general structure near an inclined guide included in the image reading unit.
Figure 5B:
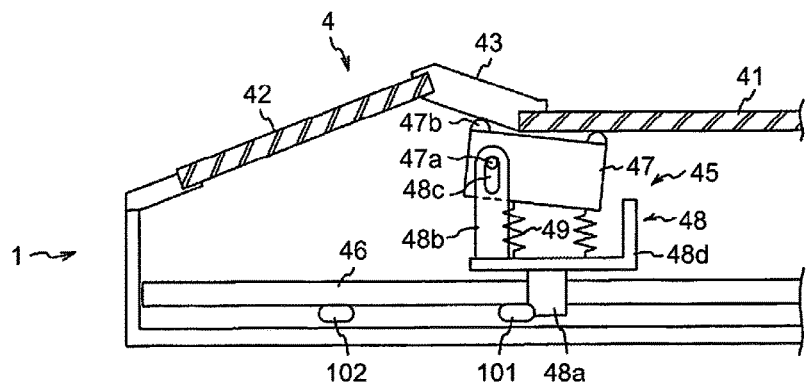
FIG. 5B is a sectional view illustrating a general structure near an inclined guide included in the image reading unit.
Figure 5C:
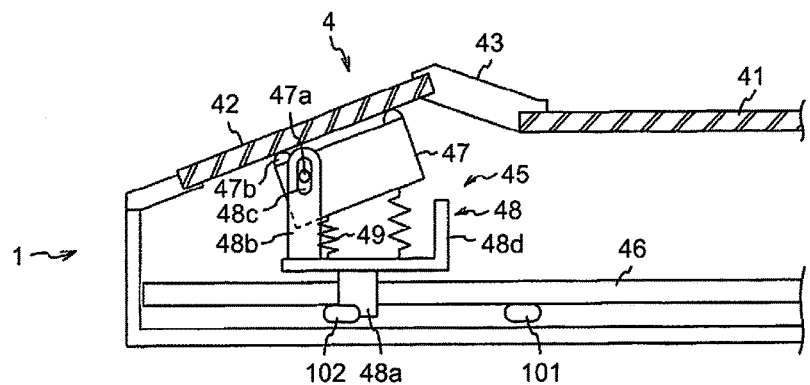
FIG. 5C is a sectional view illustrating a general structure near an inclined guide included in the image reading unit.

An operation of the reading unit 45 will now be explained. FIGS. 5(a) to 5(c) are sectional views illustrating general structures near the inclined guide 43 of the image reading unit 4. FIG. 5(a) illustrates an arrangement in the flatbed scanner mode. FIG. 5(b) illustrates an arrangement during the transition between the flatbed scanner mode and the DF scanner mode, and FIG. 5(c) illustrates an arrangement in the DF scanner mode.

The image reading device 1 is configured to be switchable between the flatbed scanner mode (set original reading mode) for reading an image of the original placed on the flat flatbed contact glass 41, and the DF scanner mode (fed original reading mode) for reading the image of the original passed across the DF contact glass 42 as the original is automatically fed by the ADF 5. In other words, the flatbed contact glass 41 is a contact glass for the flatbed scanner mode, the DF contact glass 42 is a contact glass for the DF scanner mode.

In the flatbed scanner mode, the image reading unit 4 can read the image of an original by irradiating the image plane of the original (such as an original sheet, a thick paper, or a book) on the flatbed contact glass 41 with light, and converting the reflection light from the image plane into an image signal.

In the flatbed scanner mode, the reading unit 45 can read the image of the original by scanning the image plane of the original on the flatbed contact glass 41 along each line in the main scanning direction X, as illustrated in FIG. 5(a), while the reading unit 45 is moving in the sub-scanning direction Y.

In the DF scanner mode, the ADF 5 separates one original sheet at a time from the bundle of original sheets placed on the original table 51 that is a sheet setting table, feeds the original sheet into the original conveying path 52, and conveys the original sheet along the original conveying path 52. While the original sheet is being conveyed, the original sheet gradually comes to face the top surface of the DF contact glass 42 on the image reading unit 4, from the downstream side in the conveying direction. In other words, the image reading device 1 can implement the function of the DF scanner by sequentially reading the image of the original sheet being carried by the ADF 5, on the DF contact glass 42 of the image reading unit 4.

In the DF scanner mode, the reading unit 45 can read the image of the original by scanning the image of the fed original passed across the DF contact glass 42 along each line in the main scanning direction X, as illustrated in FIG. 5(c).

The optical scanning unit 47 is held by the holding arms 48b in such a manner that the orientation of the optical scanning unit 47 (the inclination of the top surface thereof) is changed by being rotated about an axial line extending along the longitudinal direction of the optical scanning unit 47 (about the shaft-like both-end protrusions 47a), and being moved up and down along the longitudinal direction of the long holes 48c. The orientation of the optical scanning unit 47 changes depending on the position of the optical scanning unit 47 in the sub-scanning direction Y, between a first reading orientation (see FIG. 5(a)) that is a substantially horizontal orientation for reading the image of the original through the flatbed contact glass 41, and a second reading orientation (see FIG. 5(c)) that is an inclined orientation for reading the image of the original sheet through the DF contact glass 42.

To perform a reading operation in the flatbed scanner mode, the reading unit 45 travels from the home position established near a stop position indicated by a dotted line in FIG. 1 toward one end of the sub-scanning direction Y (toward the right side in the drawing). The reading unit 45, travelling from the home position toward the one end of the sub-scanning direction Y, causes the optical scanning unit 47 to scan each line at a very small increment of the travel distance, and reads the image of the surface (bottom surface) of the set original on the flatbed contact glass 41. Once the reading operation is ended, the reading unit 45 is returned to the home position. The reading unit 45 is positioned to the home position by using the signal from the HP sensor 101.

In the flatbed scanner mode, the optical scanning unit 47 travelling in the sub-scanning direction Y reads the image of the original at the first reading orientation at which the top sliders 47b are brought into contact with the bottom surface of the flatbed contact glass 41, that is, at which the top surface of the optical scanning unit 47 is substantially horizontal, as illustrated in FIG. 5(a).

To perform a reading operation in the DF scanner mode, the reading unit 45 travels from the home position to a position below the DF contact glass 42 located on the other side of the sub-scanning direction Y (the position indicated with a solid line in FIG. 1). Once the signal from the DFP sensor 102 is switched from OFF to ON during the process of the reading unit 45 travelling from the home position, the reading unit 45 is carried further toward the other side of the sub-scanning direction Y by a predetermined distance, and stops at a position below the DF contact glass 42. The optical scanning unit 47 then reads the image on the surface of a fed original passed across the DF contact glass 42, while the reading unit 45 is kept at the same position below the DF contact glass 42.

As illustrated in FIGS. 5(a) to 5(c), to perform the reading operation in the DF scanner mode, the optical scanning unit 47 travels beyond the inclined guide 43, to the position below the DF contact glass 42. The optical scanning unit 47 also reads the image of the original at the second reading orientation, as illustrated in FIG. 5(c), at which the top sliders 47b are kept in contact with the bottom surface of the DF contact glass 42, that is, at which the top surface of the optical scanning unit 47 is inclined by an inclination angle θ.

In the manner described above, the reading unit 45 is enabled to move in the sub-scanning direction Y so that the reading unit 45 can be positioned below the flatbed contact glass 41 and below the DF contact glass 42, and is enabled to change its orientation between the two orientations at which the top surface is inclined by different angles.

Hardware Block Diagram of Image Reading Device

Figure 6:
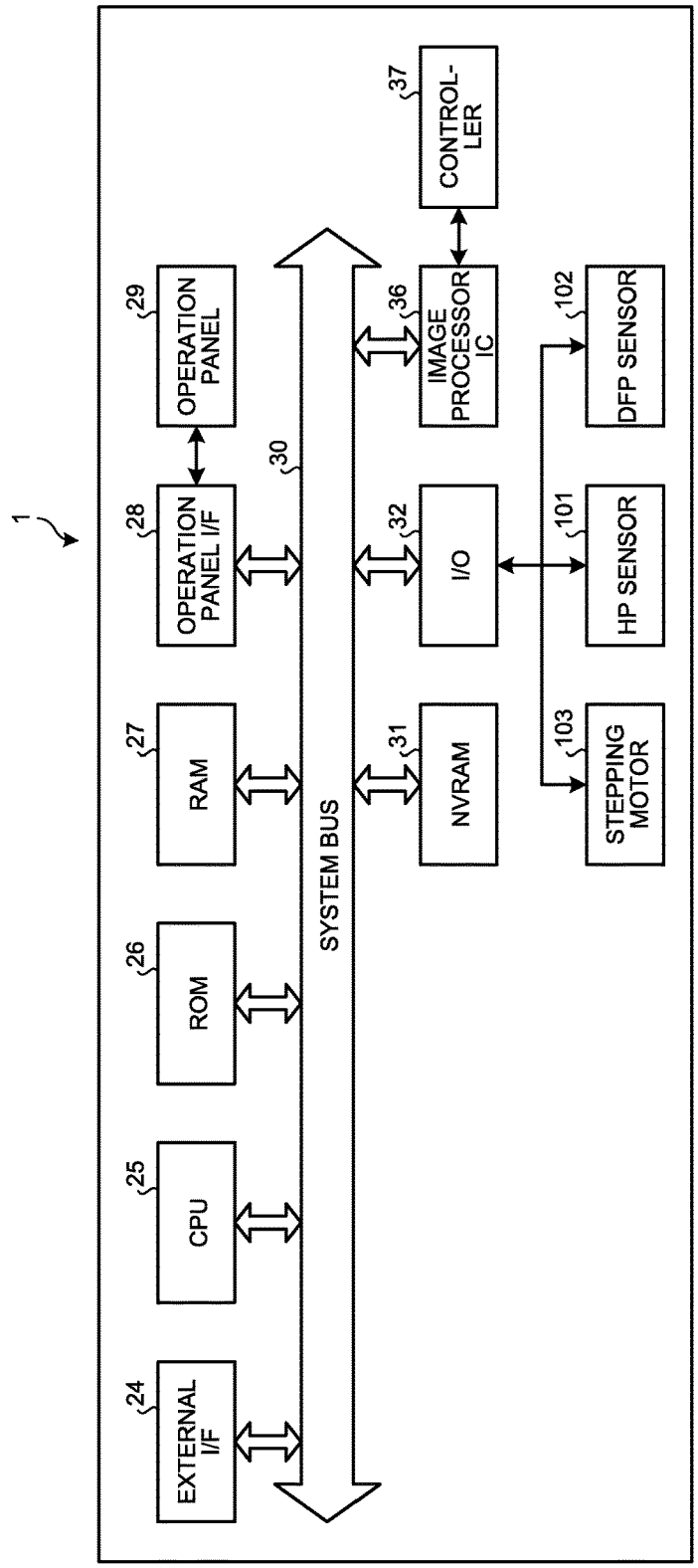
FIG. 6 is a block diagram illustrating an example of a hardware configuration of the image reading device.

A hardware configuration of the image reading device 1 will now be explained. FIG. 6 is a block diagram illustrating an example of a hardware configuration of the image reading device 1.

The image reading device 1 has a configuration in which a central processing unit (CPU) 25, a read-only memory (ROM) 26, a random access memory (RAM) 27, an operation panel interface (I/F) 28, a non-volatile random access memory (NVRAM) 31, and an image processor integrated circuit (IC) 36 are connected to a system bus 30. An external I/F 24 for connecting an external device such as a host computer, and an input/output (I/O) 32 for connecting the HP sensor 101, the DFP sensor 102, and the like are also connected to the system bus 30.

The CPU 25 controls accesses to the various devices connected to the system bus 30, comprehensively, based on a control program or the like stored in the ROM 26. The CPU 25 also processes the communication with an external device such as a host computer connected via the external I/F 24. The CPU 25 also controls inputs to and outputs from electrical components such as a sensor, a motor, a clutch, and a solenoid connected via the I/O 32.

Figure 10:
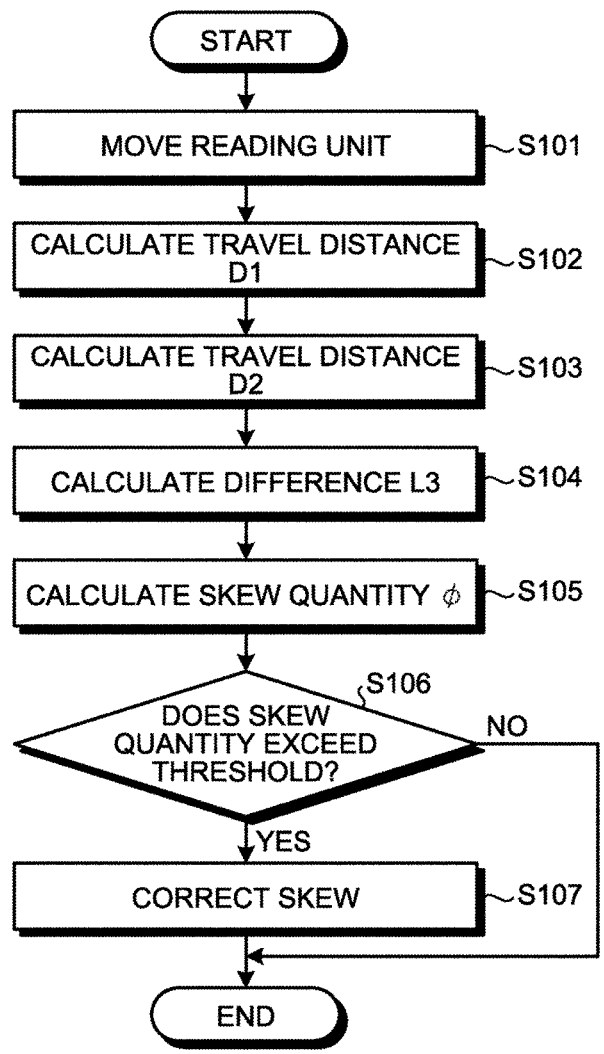
FIG. 10 is a flowchart illustrating an operation related to the skew quantity calculation in the image reading device.

The ROM 26 stores therein a control program, for example, enabling the CPU 25 to execute various processes following a procedure such as that illustrated in the flowchart in FIG. 10.

The RAM 27 is a volatile memory serving as a main memory, a working area, and the like of the CPU 25. The RAM 27 is used as an area for loading recorded data, or an area for storing environment data, for example. The CPU 25 reads a control program stored in the ROM 26, loads the control program onto the RAM 27, and executes the control program.

The NVRAM 31 is a non-volatile memory storing therein various types of information related to the image reading device 1, and used by a control program executed by the CPU 25.

An operation panel 29 via which users enter settings such as a scan mode, or check current settings is connected to the operation panel I/F 28. Settings input from the operation panel 29 via the operation panel I/F 28 are stored in the RAM 27 or the NVRAM 31.

An image processor IC 36 applies a necessary process to the image data read by the reading unit 45, and transmits the result to a controller 37.

The HP sensor 101, the DFP sensor 102, the stepping motor 103, and the like are connected to the I/O 32. The HP sensor 101 detects the reading unit 45, and outputs a detection signal. The DFP sensor 102 detects the reading unit 45, and outputs a detection signal. The stepping motor 103 is a driving source for moving the reading unit 45 in the sub-scanning direction Y.

Figure 7:
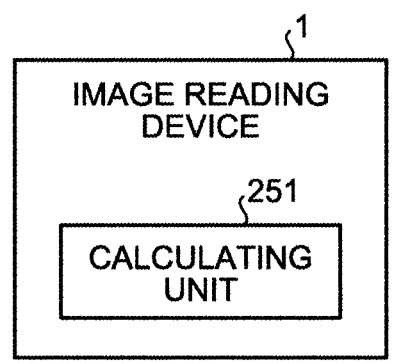
FIG. 7 is a functional block diagram illustrating exemplary functions provided to the image reading device.

A characterizing function of the image reading device 1 will now be explained. FIG. 7 is a functional block diagram illustrating exemplary functions provided to the image reading device 1. A characterizing function of the image reading device 1 is a function for causing each of the HP sensor 101 and the DFP sensor 102 disposed interspaced with respect to each other in the main scanning direction X to detect the reading unit 45, and to acquire the quantity and the direction of skew based on delays, introduced by the skew, in timing at which the respective sensors detect the reading unit 45. As illustrated in FIG. 7, the CPU 25 in the image reading device 1 functions as a calculating unit 251 by executing a control program stored in the ROM 26 using the RAM 27 as a working area.

The calculating unit 251 calculates the quantity and the direction of skew of the reading unit 45, based on a difference, introduced by the skew, between the distance by which the reading unit 45 has travelled from a measurement reference position that is positioned upstream of both of the HP sensor 101 and the DFP sensor 102 in the moving direction to the point where the reading unit 45 is detected by the HP sensor 101, and the distance by which the reading unit 45 has travelled from the measurement reference position to the point where the reading unit 45 is detected by the DFP sensor 102.

Method for Calculating Skew Quantity of Reading Unit

A method with which the calculating unit 251 calculates the quantity of skew, which is tilting of the reading unit 45, with respect to the main scanning direction X will now be explained.

Figure 8:
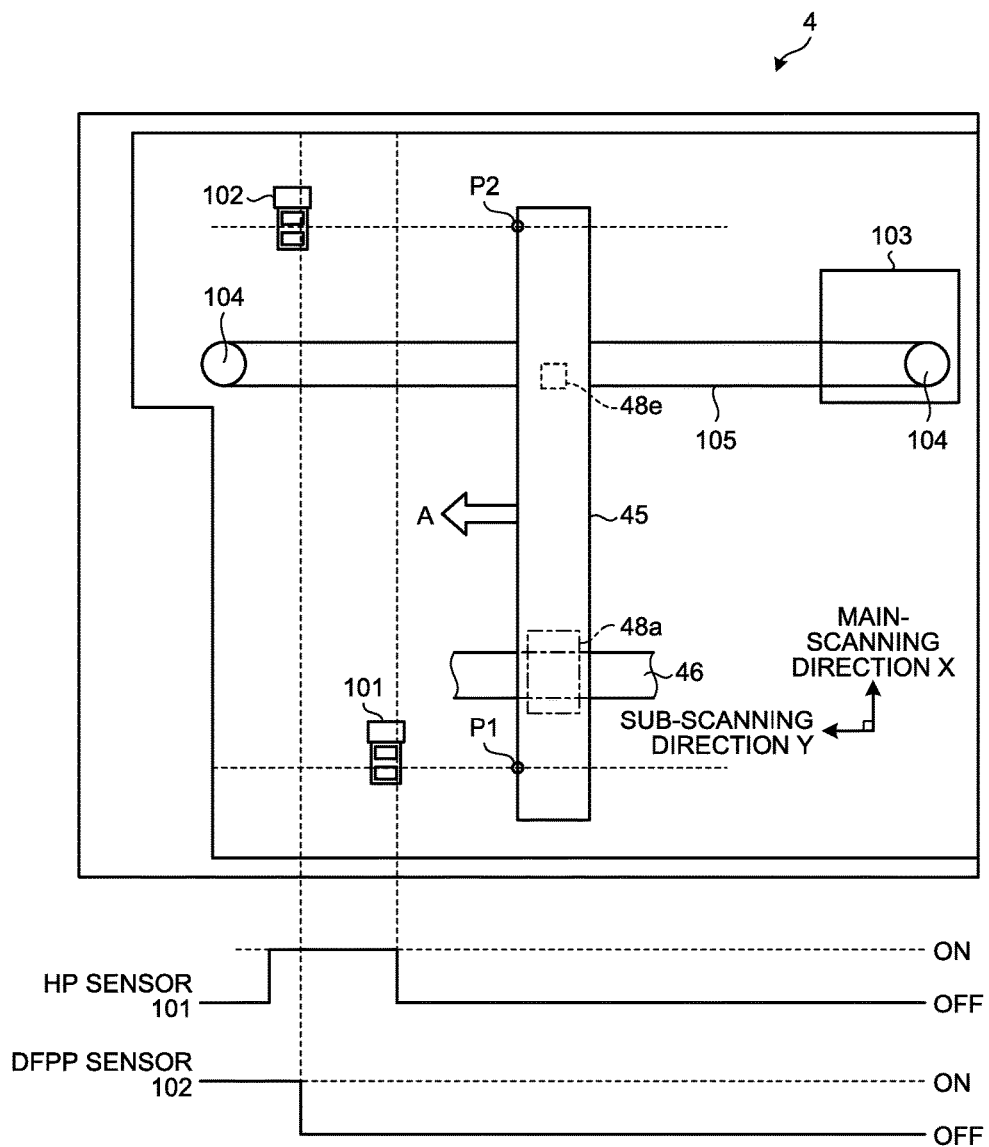
FIG. 8 is a timing chart illustrating outputs of an HP sensor and a DFP sensor, with respect to the position of the reading unit.

FIG. 8 is a timing chart illustrating outputs from HP sensor 101 and the DFP sensor 102, with respect to the position of the reading unit 45. As illustrated in the timing chart of FIG. 8, each of the HP sensor 101 and the DFP sensor 102 outputs an ON signal when the reading unit 45 is detected, and outputs an OFF signal when the reading unit 45 is not detected. In other words, the HP sensor 101 and the DFP sensor 102 output an ON/OFF signal based on the position of the reading unit 45 in the sub-scanning direction Y.

Figure 9A:
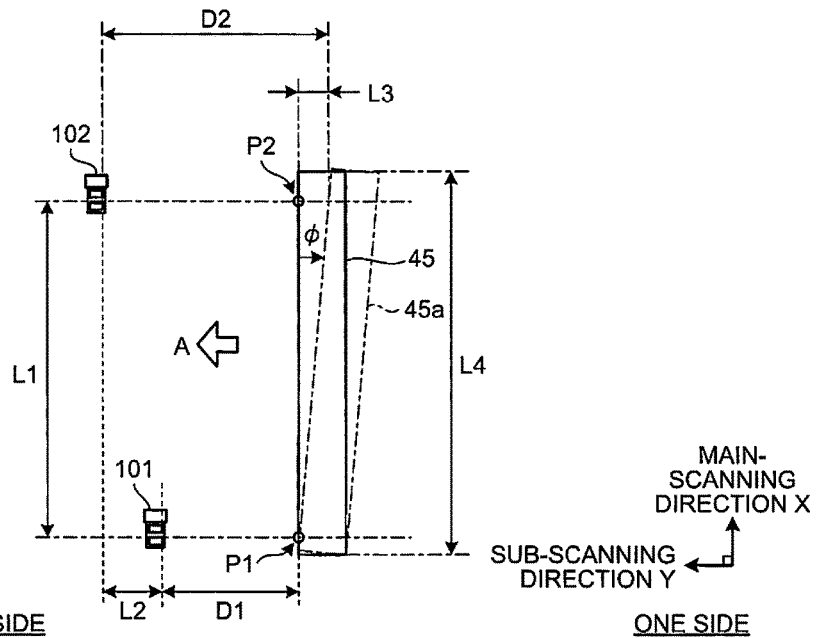
FIG. 9A is a schematic for explaining how a skew quantity is calculated.
Figure 9B:
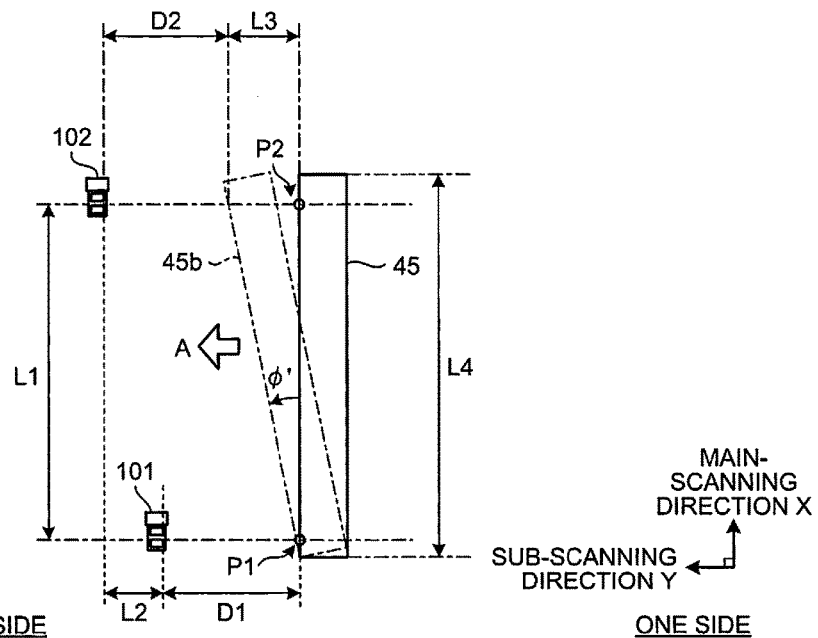
FIG. 9B is a schematic for explaining how a skew quantity is calculated.

FIGS. 9(a) and 9(b) are schematics for explaining how the skew quantity is calculated. FIG. 9(a) illustrates a condition in which the reading unit 45 is tilted by the skew quantity Φ toward one side of the sub-scanning direction Y, and FIG. 9(b) illustrates a condition in which the reading unit 45 is tilted by the skew quantity Φ' toward the other side of the sub-scanning direction Y. The distance by which the reading unit 45 being driven by the stepping motor 103 has travelled from a position located on one side of both of the HP sensor 101 and the DFP sensor 102 in the sub-scanning direction Y (a measurement reference position on the upstream side of these sensors in the moving direction: the position of the reading unit 45 illustrated in the solid lines in FIGS. 9(a) and 9(b), for example) toward the other side in the direction of the arrow A (toward the downstream side in the moving direction) can be calculated by "distance travelled per pulse"×"total pulse count".

The calculating unit 251 counts the total pulse count of the stepping motor 103, starting from the measurement reference position at which the OFF signal is output from the HP sensor 101 and ending at the point where the ON signal is output from the HP sensor 101, and calculates a travel distance D1 by which the position P1 has travelled from the measurement reference position to the point where the position P1 is detected by the HP sensor 101 based on the total pulse count. The calculating unit 251 also stores the calculated travel distance D1 in the RAM 27.

The calculating unit 251 also counts the total pulse count of the stepping motor 103, starting from the measurement reference position where the OFF signal is output from the DFP sensor 102 and ending at the point where the ON signal is output from the DFP sensor 102, and calculates a travel distance D2 by which the position P2 has travelled from the measurement reference position to the point where the position P2 is detected by the DFP sensor 102 based on the total pulse count. The calculating unit 251 also stores the calculated travel distance D2 in the RAM 27.

The measurement reference position is a position where the amount of movement of the reading unit 45 starts being measured. This position may be set to any position on the upstream side of the HP sensor 101 and the DFP sensor 102 in the moving direction. In other words, the measurement can be started from any position located on the one side of the sub-scanning direction Y.

Depending on the arrangement of the HP sensor 101 and the DFP sensor 102, the ON signal and the OFF signal output from the HP sensor 101 and the DFP sensor 102 may be reversed. Furthermore, the calculating unit 251 may omit the distance calculation, and store the counted total pulse count in the RAM 27.

It is assumed herein that the HP sensor 101 and the DFP sensor 102 are installed at positions that are away from each other by interspace L1 in the main scanning direction X, and by interspace L2 in the sub-scanning direction Y. It is also assumed now that, as illustrated in FIG. 9(a), the reading unit 45, which should be oriented at the position indicated by the solid line, is tilted by the skew quantity Φ (angle) toward the one side of the sub-scanning direction Y, and is at a first skew orientation 45a. Denoting the displacement (distance) of the position P2 introduced by the skew of the reading unit toward the one side of the sub-scanning direction Y as L3, the difference L3 can be expressed as the following Equation (1).

$$L3 = D2 - D1 - L2 \quad (1)$$

The skew quantity Φ can be expressed as the following Equation (2).

$$\phi = \tan^{-1}\frac{L3}{L1}\phi \quad (2)$$

When the reading unit 45 is tilted by the skew quantity Φ' toward the other side of the sub-scanning direction Y, and is at a second skew orientation 45b, as illustrated in FIG. 9(b), the difference L3 will take a negative value. In this manner, the skew direction of the reading unit 45 can be acquired based on the sign of the difference L3.

It is preferable for the interspace L1 between the HP sensor 101 and the DFP sensor 102 in the main scanning direction X to be large as much as possible. When the interspace L1 is increased, the difference L3 expressed by Equation (2) is also increased, and therefore, the skew quantity Φ can be acquired more accurately. The interspace L1 may be set to "L1=L4" at most, where L4 denotes the length of the reading unit 45 in the main scanning direction X.

Furthermore, when there is some assembly error among the sensors before the shipment, it is possible to calculate the skew quantity Φ more accurately by measuring the interspace L1 and the interspace L2 for each of the image reading devices 1, and storing the values in the NVRAM 31 illustrated in FIG. 6.

Flowchart

FIG. 10 is a flowchart illustrating an operation related to the skew quantity calculation in the image reading device 1.

At Step S101, the calculating unit 251 moves the reading unit 45 from the measurement reference position to the other side of the sub-scanning direction Y, by driving the stepping motor 103. At this time, the calculating unit 251 counts the number of pulses of the stepping motor, starting from the measurement reference position.

At Step S102, the calculating unit 251 calculates the travel distance D1 by which the position P1 of the reading unit 45 has travelled from the measurement reference position to the point where the output of the HP sensor 101 is switched from OFF to ON, based on the total pulse count of the stepping motor 103. The calculating unit 251 then stores the calculated travel distance D1 in the RAM 27.

At Step S103, the calculating unit 251 calculates the travel distance D2 by which the position P2 of the reading unit 45 has travelled from the measurement reference position to the point where the output from the DFP sensor 102 is switched from OFF to ON, based on the total pulse count of the stepping motor 103. The calculating unit 251 then stores the calculated travel distance D2 in the RAM 27.

At Step S104, the calculating unit 251 reads the interspace L2 between the HP sensor 101 and the DFP sensor 102 in the sub-scanning direction Y from the NVRAM 31, and calculates the difference L3 using Equation (1).

At Step S105, the calculating unit 251 reads the interspace L1 between the HP sensor 101 and the DFP sensor 102 in the main scanning direction X from the NVRAM 31, and calculates the skew quantity Φ using Equation (2).

At Step S106, the calculating unit 251 reads a skew threshold Φt from the NVRAM 31, and determines whether the calculated skew quantity Φ exceeds the threshold Φt. The threshold Φt may be a fixed value set at the time of factory shipping, or may be a value entered by a user, via an input unit such as the operation panel 29. If the calculated skew quantity Φ does not exceed the threshold Φt (NO at Step S106), the calculating unit 251 ends the process. If the calculated skew quantity Φ exceeds the threshold Φt (YES at Step S106), the image reading device 1 executes the process at Step S107.

At Step S107, the image reading device 1 executes a skew correction.

Skew Correction Method

The image reading device 1 can execute any one of the following skew corrections.

As a first skew correction method, the image processor IC 36 can correct the skew by rotating the scan image resultant of reading by the reading unit 45 in a direction opposite to the skew direction, based on the skew direction (whether the sign of the difference L3 is positive or negative) and the value of the skew quantity Φ, and outputs the resultant image.

As a second skew correction method, the CPU 25 can also correct the skew of the reading unit 45 by moving the reading unit 45 to the home position once, and driving the reading unit 45 in the sub-scanning direction Y. If the reading unit 45 become skewed by some abrupt cause (such as generation of dust, or an application of a force from the outside), the skew of the reading unit 45 can sometimes be corrected by moving the reading unit 45 in the sub-scanning direction Y (for example, by reciprocating once between the home position and the one end of the sub-scanning direction Y). At this time, it is preferable for the CPU 25 to execute the process from Steps S101 to S106 again, while trying out this skew correction, to determine whether a skew correction using another method is necessary.

When the image reading device 1 has two motors for moving the respective ends of the reading unit 45 in the main scanning direction X, as means for driving the reading unit 45, the image reading device 1 may also execute a third skew correction method below. In the third skew correction method, the CPU 25 corrects the skew of the reading unit 45 by causing the two motors to drive by a different degree, based on the skew direction and the value of the skew quantity Φ.

The image reading device 1 may cause a notifying unit, such as a display or a speaker, to issue a warning to the user, using an image or sound, while the skew correction at Step S107 is being executed. The warning may be issued when the skew quantity Φ exceeds the threshold Φt by a large degree, e.g., when the skew quantity Φ exceeds a second threshold that is greater than the threshold Φt.

The image reading device 1 according to the embodiment is characterized in being provided with the reading unit 45 having the scanning section 47s extending in the main scanning direction X and configured to optically read an image of an original, the driving unit (such as the stepping motor 103) configured to move the reading unit 45 in the sub-scanning direction Y, the first detecting unit (the HP sensor 101) configured to detect the position of the reading unit 45 in the sub-scanning direction Y, the second detecting unit (the DFP sensor 102) disposed at a position different from that of the first detecting unit (the HP sensor 101) in the main scanning direction X, and configured to detect the position of the reading unit 45 in the sub-scanning direction Y, and the calculating unit 251 configured to calculate a skew quantity Φ and a skew direction of the reading unit 45, based on a difference (L3) between the travel distance (D1) by which the reading unit 45 has travelled from the measurement reference position located on the upstream side of the first detecting unit (the HP sensor 101) and the second detecting unit (the DFP sensor 102) in the moving direction to a point where the reading unit 45 is detected by the first detecting unit (the HP sensor 101), and the travel distance (D2) by which the reading unit 45 has travelled from the measurement reference position to a point where the reading unit 45 is detected by the second detecting unit (the DFP sensor 102).

When the reading unit 45 becomes skewed, a change in the travel distance, resulting from the displacement of the reading unit 45, appears more prominently in the sub-scanning direction Y, than the change observed in the length of the reading unit 45 in the main scanning direction X. In the embodiment, because the first detecting unit (the HP sensor 101) and the second detecting unit (the DFP sensor 102) are disposed interspaced with respect to each other in the main scanning direction X, and the skew quantity is calculated based on the travel distances by which the respective points of the reading unit 45 have travelled in the sub-scanning direction Y, the respective points being detected by the first detecting unit (the HP sensor 101) and the second detecting unit (the DFP sensor 102), respectively, the accuracy of the skew quantity calculation can be improved, compared with the conventional technology. Furthermore, because an increase or a decrease in the travel distance of each of the points of the reading unit 45 is dependent on the skew direction, with such points being detected by the first detecting unit (the HP sensor 101) and the second detecting unit (the DFP sensor 102), respectively, the skew direction, that is, the direction of tilting can also be calculated. Furthermore, because the first detecting unit (the HP sensor 101) and the second detecting unit (the DFP sensor 102) both detect the reading unit 45, an increase of the device size can be prevented.

According to the embodiment, the skew quantity can be detected more accurately, without increasing the size of the device.

Furthermore, the skew quantity and the skew direction can also be calculated even in a configuration in which the first detecting unit (the HP sensor 101) and the second detecting unit (the DFP sensor 102) are disposed at the same position in the sub-scanning direction Y (when L2=0 in FIGS. 9(*a*) and 9(*b*)).

The image reading device 1 according to the embodiment is characterized in that the second detecting unit (the DFP sensor 102) and the first detecting unit (the HP sensor 101) are disposed interspaced with respect to each other in the sub-scanning direction Y.

In the embodiment, the first detecting unit (the HP sensor 101) and the second detecting unit (the DFP sensor 102) are disposed at different positions in the sub-scanning direction Y. Therefore, the same HP sensor 101 for moving the reading unit 45 to the home position can be used as the first detecting unit, and the same DFP sensor 102 for moving the reading unit 45 to the position below the DF contact glass 42 can be used as the second detecting unit (the DFP sensor 102). In other words, according to the embodiment, the skew detection becomes possible without newly installing any dedicated sensor for detecting the skew.

The image reading device 1 according to the embodiment is characterized in being provided with the non-volatile storage unit (the NVRAM 31) configured to store therein an interspace distance in the main scanning direction X, and an interspace distance in the sub-scanning direction Y, between the first detecting unit (the HP sensor 101) and the second detecting unit (the DFP sensor 102).

If the first detecting unit (the HP sensor 101) and the second detecting unit (the DFP sensor 102) have some assembly errors, and the skew quantity and the skew direction are calculated based on interspace distances as designed without giving any consideration to the error, the resultant values become erroneous, and this will be a problem. To solve this problem, in the embodiment, the interspace distances between the two detecting units are stored in a non-volatile storage unit such as the NVRAM 31 at the time of factory shipping, and therefore, by using such values, the skew quantity and the direction can be calculated highly accurately.

The image reading device 1 according to the embodiment is characterized in that the first detecting unit (the HP sensor 101) detects the one end of the reading unit 45 in the main scanning direction X, and the second detecting unit (the DFP sensor 102) detects the other end of the reading unit 45 in the main scanning direction X.

The displacement resulting from skew of the reading unit 45 appears more prominently when the first detecting unit (the HP sensor 101) and the second detecting unit (the DFP sensor 102) are disposed further away from each other in the main scanning direction X. According to the embodiment, because the first detecting unit (the HP sensor 101) and the second detecting unit (the DFP sensor 102) are positioned in such a manner that detected are the respective ends of the reading unit 45 in the main scanning direction X, the skew quantity can be calculated more accurately.

The image reading device 1 according to the embodiment is characterized in being provided with a skew correcting unit (for example, the image processor IC 36) configured to correct skew in the image of the original read by the reading unit 45, based on the skew direction and the skew quantity of the reading unit 45, calculated by the calculating unit 251.

According to the embodiment, an image corrected highly accurately can be provided, because the read image is corrected based on the information of the skew quantity and the skew direction calculated highly accurately.

The image reading device 1 according to the embodiment is characterized in that, when the skew quantity of the reading unit 45, calculated by the calculating unit 251, is equal to or greater than a threshold, the driving unit (such as the stepping motor 103) is caused to move the reading unit 45 in the sub-scanning direction Y in such a manner that the skew of the reading unit 45 is corrected.

When the skew is temporal skew resultant of some abrupt cause, the skew may be resolved merely by moving the reading unit 45 in the sub-scanning direction Y. According to the embodiment, because the skew itself can be removed by moving the reading unit 45, a reading image without skew can be provided.

The image reading device 1 according to the embodiment is characterized in being provided with a notifying unit (a display or a speaker) configured to, when the skew quantity of the reading unit 45 calculated by the calculating unit 251 is equal to or greater than the threshold, notify the outside that the skew quantity has exceeded the threshold.

According to the embodiment, a user can be notified that the read image has been skewed.

The image reading device 1 according to the embodiment is characterized in being provided with an input unit (the operation panel 29) configured to receive an input of the threshold of the skew quantity from the outside.

According to the embodiment, an optimal threshold can be set, depending on users.

A control program executed by the image reading device 1 according to the embodiment is provided in a manner recorded in a computer-readable recording medium such as a compact disc read-only memory (CD-ROM), a flexible disk (FD), a compact disc recordable (CD-R), or a digital versatile disc (DVD), as a file in an installable or executable format.

Furthermore, the control program executed by the image reading device 1 according to the embodiment may be provided by storing the control program in a computer connected to a network such as the Internet, and making available for download over the network. Furthermore, the control program executed by the image reading device 1 according to the embodiment may be provided or distributed over a network such as the Internet.

According to the present embodiments, a skew quantity can be detected more accurately, and the direction of the skew can be detected, without increasing the size of the device.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image reading device comprising:
   an image reader configured to include a scanning section extending in a main scanning direction, and configured to optically read an image of an original;
   an image reader driver configured to move the image reader in a sub-scanning direction;
   a first sensor configured to detect a position of the image reader in the sub-scanning direction;
   a second sensor configured to be disposed at a position different from that of the first sensor in the main scanning direction, and configured to detect a position of the image reader in the sub-scanning direction; and
   memory storing computer-readable instructions; and
   one or more processors configured to execute the computer-readable instructions such that the one or more processors are configured to perform operations including,
   calculating a skew quantity and a skew direction of the image reader, based on a difference, introduced by the skew, between a travel distance by which the image reader has travelled from a measurement reference position located on an upstream side of the first sensor and the second sensor in a moving direction to a point where the image reader is detected by the first sensor, and a travel distance by which the image reader has travelled from the measurement reference position to a point where the image reader is detected by the second sensor, and
   correcting the skew by at least one of rotating an image read by the image reading unit or moving the image reader.

2. The image reading device according to claim 1, wherein the second sensor and the first sensor are disposed interspaced with respect to each other in the sub-scanning direction.

3. The image reading device according to claim 1, wherein the memory is configured to store therein an interspace distance in the main scanning direction, and an interspace distance in the sub-scanning direction, between the first sensor and the second sensor.

4. The image reading device according to claim 1, wherein the first sensor is configured to detect one end of the image reader in the main scanning direction, and the second sensor is configured to detect the other end of the image reader in the main scanning direction.

5. The image reading device according to claim 1, wherein the one or more processors are configured to correct skew in the image of the original read by the image reader, based on the skew direction and the skew quantity of the image reader, calculated by the calculating unit.

6. The image reading device according to claim 1, wherein when the skew quantity of the image reader calculated by the one or more processors is equal to or greater than a threshold, the image reader driver is configured to move the image reader in the sub-scanning direction in such a manner that the skew of the image reader is corrected.

7. The image reading device according to claim 6, further comprising a user input device configured to receive an input of the threshold of the skew quantity from the outside.

8. The image reading device according to claim 1, wherein the one or more processors are configured to, when the skew quantity of the image reader calculated by the one or more processors is equal to or greater than a threshold, notify outside that the skew quantity has exceeded the threshold.

9. The image reading device according to claim 8, further comprising user input device configured to receive an input of the threshold of the skew quantity from the outside.

10. The image reading device according to claim 1, wherein calculating the skew quantity and skew direction includes counting a number of pulses of the image reader driver starting from the measurement reference position, calculating the travel distances based on a total pulse count of the image reader driver, and reading an interspace distance the first sensor and the second sensor in the sub-scanning direction.

11. An image reading method performed by an image reading device, the image reading device including:
   an image reader configured to include a scanning section extending in a main scanning direction, and configured to optically read an image of an original;
   a image reader driver configured to move the image reader in a sub-scanning direction;
   a first sensor configured to detect a position of the image reader in the sub-scanning direction; and
   a second sensor configured to be disposed at a position different from that of the first sensor in the main scanning direction, and configured to detect a position of the image reader in the sub-scanning direction, the image reading method comprising
   calculating a skew quantity and a skew direction of the image reader based on a difference, introduced by the skew, between a travel distance by which the image reader has travelled from a measurement reference position located on an upstream side of the first sensor and the second sensor in a moving direction to a point where the image reader is detected by the first sensor, and a travel distance by which the image reader has travelled from the measurement reference position to a point where the image reader is detected by the second sensor, and
   correcting the skew by at least one of rotating an image read by the image reading unit or moving the image reader.

12. A non-transitory computer-readable medium comprising computer readable program codes, performed by a processor configured to control an image reading device, the image reading device including:
   an image reader configured to include a scanning section extending in a main scanning direction, and configured to optically read an image of an original;
   a image reader driver configured to move the image reader in a sub-scanning direction;
   a first sensor configured to detect a position of the image reader in the sub-scanning direction; and
   a second sensor configured to be disposed at a position different from that of the first sensor in the main scanning direction, and configured to detect a position of the image reader in the sub-scanning direction,
the program codes when executed causing the processor to execute:
   calculating a skew quantity and a skew direction of the image reader based on a difference, introduced by the skew, between a travel distance by which the image reader has travelled from a measurement reference position located on an upstream side of the first sensor and the second sensor in a moving direction to a point where the image reader is detected by the first sensor, and a travel distance by which the image reader has travelled from the measurement reference position to a point where the image reader is detected by the second sensor, and
   correcting the skew by at least one of rotating an image read by the image reading unit or moving the image reader.

* * * * *